July 21, 1931.  R. C. LEIMBERGER  1,815,785
ROLL STATIONERY SUPPORT
Filed June 8, 1928
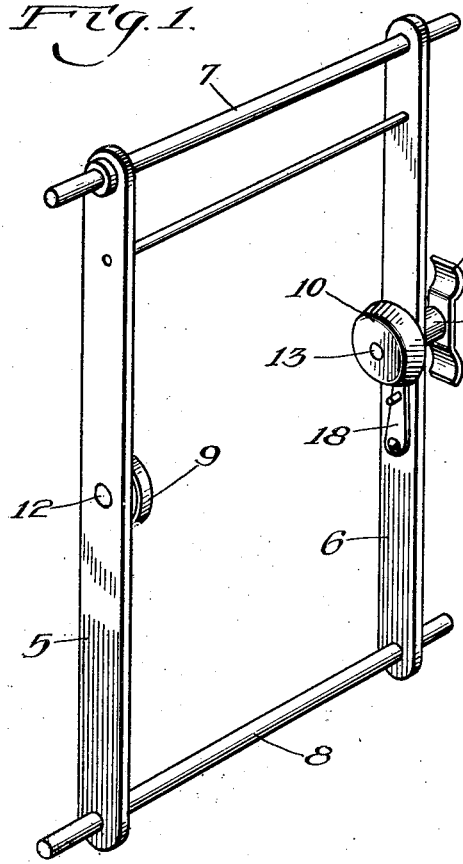
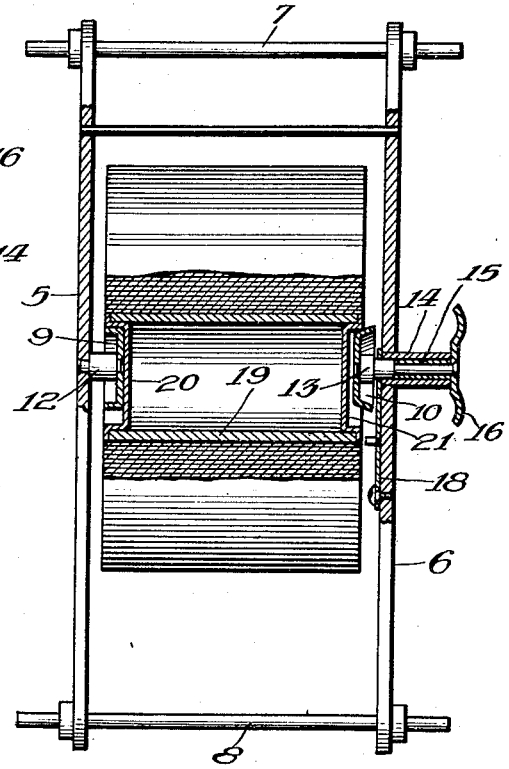
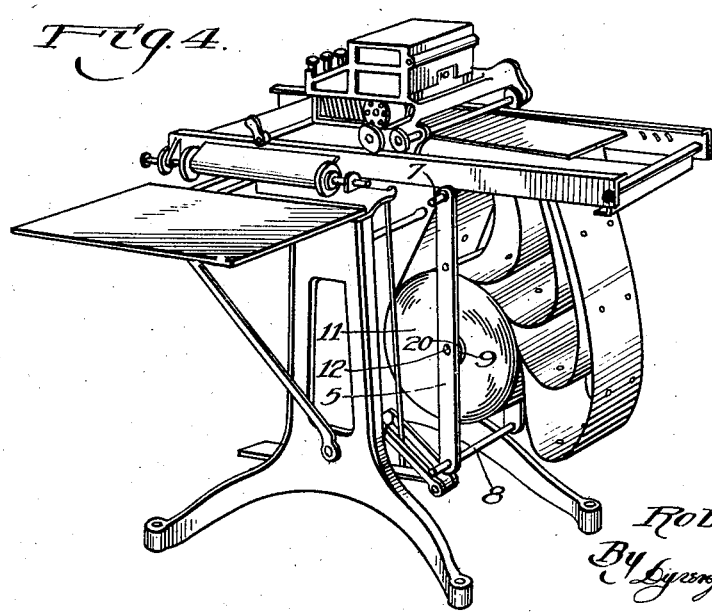
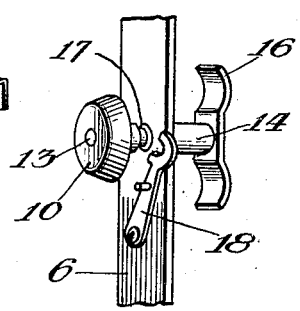
Inventor:
Robert C. Leimberger, Patented July 21, 1931

1,815,785

UNITED STATES PATENT OFFICE

ROBERT C. LEIMBERGER, OF CINCINNATI, OHIO, ASSIGNOR, BY MESNE ASSIGNMENTS, TO UNITED AUTOGRAPHIC REGISTER CO., OF CHICAGO, ILLINOIS, A CORPORATION OF ILLINOIS

ROLL STATIONERY SUPPORT

Application filed June 8, 1928. Serial No. 283,867.

This invention relates especially to a roll stationery support which is of trapeze type adapted to hold a roll of stationery in axially horizontal position.

An object of my invention is to provide such a roll support as will be especially adapted to office appliances requiring a continuous paper web supply.

A further object is to produce a support which will permit of rapid change from one supply roll to another or most readily permit of the replacement of used rolls with fresh ones with utmost ease.

A still further object is to produce such a roll stationery support as will maintain uniform centralization of the roll of stationery relatively to a device in which the stationery is being used.

A further object is to produce such a support as will provide a means of braking the roll automatically and uniformly against inadvertent unwinding regardless of the size of the roll diameter, and in which variation in the weight of the roll as it is used will function to cause such a uniform braking action.

These and other objects are attained in the roll support described in the following specification and illustrated in the accompanying drawings, in which:

Fig. 1 is a perspective view of a roll support embodying my invention.

Fig. 2 is an elevational view showing my improved roll support, parts being shown in section to disclose features of the construction.

Fig. 3 is a fragmental perspective view of a detail of my invention.

Fig. 4 is a perspective view showing an Elliott Fisher typewriter utilizing a trapeze roll support embodying my invention.

My improved roll support consists of a frame having two side bars 5 and 6 between which the roll of stationery is supported and which are held apart by spacer rods 7 and 8. Between these spacer rods are located the roll bearings 9 and 10 which are mounted on the respective side bars 5 and 6. Bearing 9 is a relatively stationary bearing while bearing 10 is axially movable toward and away from bearing 9, both bearings being in axial alignment to support the roll of stationery 11 thereon as shown in Fig. 2. Bearing 9 is preferably formed of a shallow cup shaped element or disc which is riveted or otherwise rigidly secured to a short spacer 12 extending from a side bar 5 to hold the bearing away from the side bar. Bearing 10 is frustroconically cup-shaped and is secured to an axially reciprocable spindle 13 mounted in a shell 14 which is secured to the side bar 6. This shell holds a spring 15 which presses the bearing 10 toward the bearing 9. A handle 16 on the spindle 13 limits the movement of the bearing 10 toward the bearing 9 so that a roll between the bearings will rotate freely without binding. A groove 17 in spindle 13 has been provided to receive a latch 18 which is pivoted on the side of bar 6, so that the bearing 10 may be locked against inadvertent movement away from the roll mounted between the bearings.

Roll 11 is provided with a core 19 of tubular material such as card board. In the ends of this card board core flanged metal cup shaped caps 20 and 21 are pressed. These afford good interior bearing surfaces for the bearings 9 and 10 so that the paper roll may rotate easily and with a uniform degree of friction during the feeding of the paper web from the roll.

In Fig. 2 I have shown the features of novelty of invention which produce its two principal points of advantage. It will be seen that the interior roll core cap diameters are larger than the diameters of the two bearings which occupy them. This, as shown in Fig. 2, causes the roll to hang upon the bearings so that rotation of the roll takes place by a slipping or sliding action of the roll caps 20 and 21 on the tops of the bearings 9 and 10. This off center hanging of the roll on its mounting bearings produces a braking action on the roll which keeps it from unwinding through its own momentum or because of the weight of the web of the paper which may be hanging from the roll as it is drawn away. The braking action is dependent in the degree of force exerted, upon the weight of the roll, so that when the roll is large in diameter the braking action is greater and as it decreases in diameter the braking action becomes less. This is of material advantage in preventing trouble from unwinding through the weight of the paper web hanging from the roll and causing its inertia of rotation to continue without assistance until the roll is all unwound.

Naturally when the roll is large it would have much more inertia of movement to be overcome in the event it started to unwind, hence the necessity of more braking action. But, as the roll diameter decreases this mass inertia becomes less, hence the necessity for less braking action. Thus the element of decreasing roll weight is advantageously employed to give the roll the required degree of braking action as the paper is used from it.

Another marked advantage of my construction which is also illustrated in Fig. 2 is the use of the frustroconical bearing 10. It will be seen that the annular outer edge of the bearing surface of the roll cap 21 contacts the sloping annular surface of the bearing 10. This causes the roll to have a shifting tendency always exerting a push of the roll toward the bearing 9 as shown, because of the incline action upon the bearing 10, thus keeping the roll as far toward the bearing 9 as it can go. This assures that the paper being drawn from the roll will always come off from the same transverse position because it is so guided in this manner as to keep it from transverse shifting movement through the roll shifting on its axis.

Of course the same idea of off center suspension of the roll and its self centering suspension by reason of the conical bearing 10, may be as readily embodied in any other structure than the trapeze I have shown, but the convenient trapeze adaptation I have shown is of especial value in that it enables the user to load the roll in the support less awkwardly than would be the case were it necessary to load it on supports directly attached to the machine in which the stationery was to be used. So that, for such machines as that which I have illustrated in Fig. 4, the trapeze is of great value as a convenience to the operator in saving time, labor and patience.

The manner of placing the roll between the bearings is simple and merely consists in releasing latch 18 as shown in Fig. 3, then pulling out on handle 16 and, after placing the roll in position, releasing the handle to allow bearing 10 to enter cap 21, when the latch may again be restored to engage with notch 17 of spindle 13 in order to prevent inadvertent disengagement of the roll from its mounted position.

Having thus described my invention what I claim is:

1. In a device of the character set forth, a frame, a pair of opposed bearings, one of said bearings being of relatively small diameter, and a roll having at its ends relatively large diameter bearings suspended on said first mentioned bearings and being axially shiftable thereon, one of said frame bearings being provided with an inclined bearing surface serving to hold said roll in alinement.

2. In a device of the character set forth, a frame, a pair of opposed bearings, one of said bearings being of relatively small diameter, a roll having at its ends relatively large diameter bearings suspended on said first mentioned bearings and being axially shiftable thereon, one of said frame bearings being provided with an inclined bearing surface serving to hold said roll inalignment, and a releasable latch member adapted to lock one of said bearings against longitudinal movement.

3. In a device of the character set forth, a frame, a pair of opposed bearings of relatively small diameter carried by said frame, and a roll having at its ends relatively large diameter bearings suspended on said first mentioned bearing and being axially shiftable thereon, one of said frame bearings being provided with an inclined bearing surface serving to hold said roll in alignment.

In testimony whereof I have hereunto affixed my signature.

ROBERT C. LEIMBERGER.